March 18, 1969    W. B. OELLERICH ET AL    3,432,932
APPARATUS FOR LOCATING CENTER OF WORK SPINDLE
Filed March 8, 1967
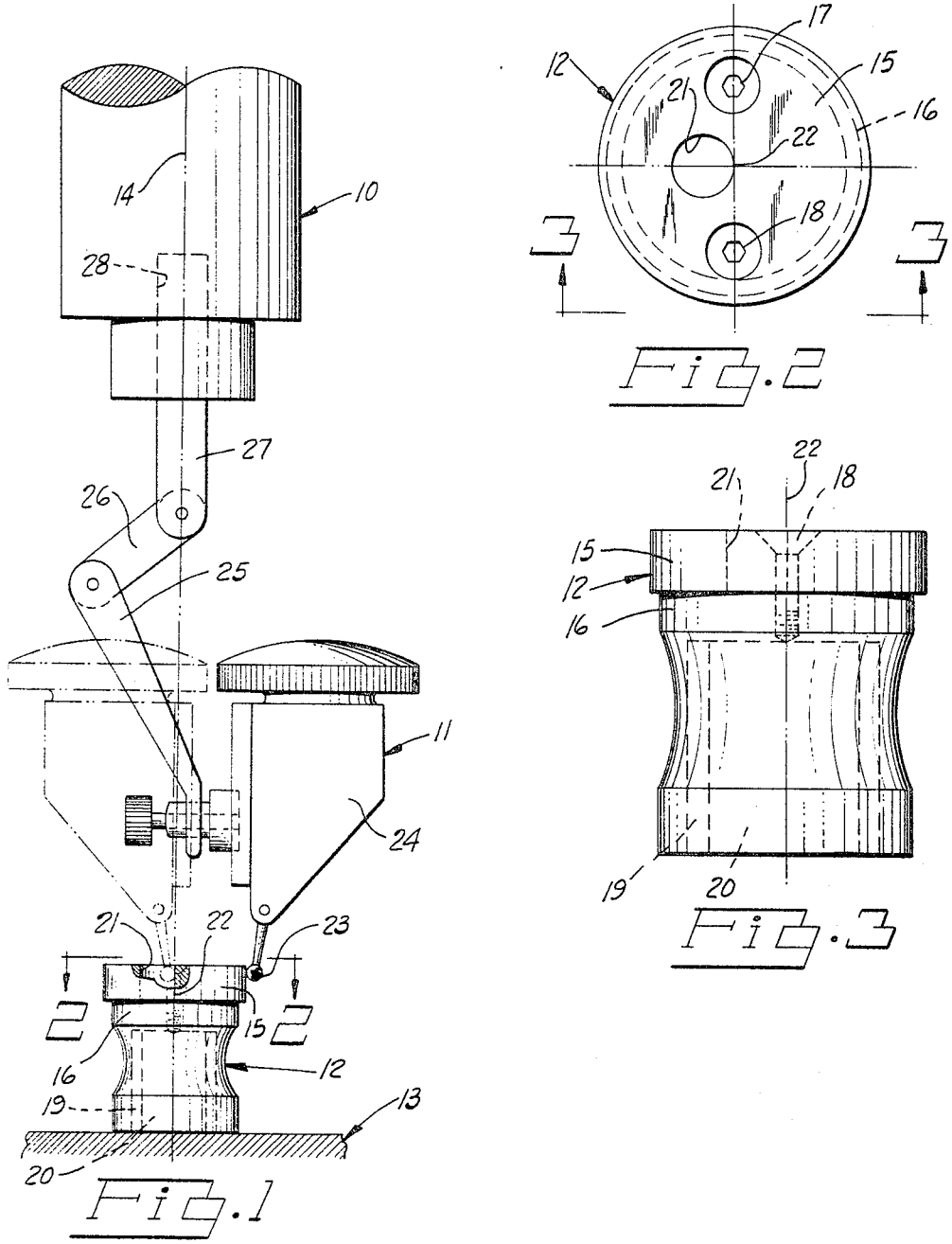
INVENTORS.
WERNER B. OELLERICH
BY RICHARD A. HURICK
Donnelly, Mentag & Harrington
ATTORNEYS

United States Patent Office 3,432,932
Patented Mar. 18, 1969

3,432,932
APPARATUS FOR LOCATING CENTER OF WORK SPINDLE
Werner B. Oellerich, 14170 Barbara St. 48154, and Richard A. Hurick, 36811 Angeline Circle 48150, both of Livonia, Mich.
Filed Mar. 8, 1967, Ser. No. 621,554
U.S. Cl. 33—172                3 Claims
Int. Cl. G01b *3/22*

ABSTRACT OF THE DISCLOSURE

An instrument for locating the true center of the spindle on a jig boring machine, a jig grinder, a boring milling machine, a basic milling machine, and the like, which includes a circular plate having a precision-ground outer periphery or diameter, and a hole in the upper surface of said plate disposed tangent to the center line of the plate. The instrument is provided with magnet means for releasably securing the same in adjusted positions on the worktable of a machine tool.

Summary of the invention

Heretofore, various instruments have been provided for locating the edges of workpieces disposed on the worktable of a machine tool such as a jig boring machine, a milling machine and the like. Examples of such prior art instruments are illustrated in U.S. Patents Nos. 2,533,198 and 2,665,492. A disadvantage of such prior art edge locating instruments is that they must be used for locating each and every workpiece on a worktable relative to the true center of the tool spindle of a machine tool. In view of the foregoing, it is an important object of the present invention to provide an instrument for locating the true center of a spindle on a machine tool which will overcome the disadvantages of the prior art workpiece edge finders.

It is another object of the present invention to provide a true center locating instrument which can be used for locating the center line of a work spindle whereby it is possible for the operator of a machine tool to locate the edges of a workpiece and other details without setting up each and every workpiece by means of an edge finder.

It is another object of the present invention to provide a spindle true center locating instrument which includes a body member, a circular plate having a precision ground outer diameter, said circular plate being attached to said body, a hole formed in said plate on the upper surface thereof in a position tangent to the axial center line of said circular plate, and means for releasably holding said body in place on the worktable of a machine tool.

It is a further object of the present invention to provide a simple machine tool spindle center-line locating instrument which is simple and compact in construction, economical to manufacture, and efficient in use.

Other features and advantages of this invention will be apparent from the following detailed description, appended claims, and the accompanying drawing.

In the drawing:

FIG. 1 is an elevational view of a machine tool spindle center line locating instrument made in accordance with the principles of the present invention, and showing the instrument mounted on a fragmentary portion of a machine tool worktable in an operative position relative to an indicating means and a machine tool spindle;

FIG. 2 is an enlarged, horizontal plan view of the center line locating instrument illustrated in FIG. 1, taken on the line 2—2 thereof, and looking in the direction of the arrows; and FIG. 3 is an enlarged, side elevation view of the center line locating instrument shown in FIG. 2, taken along the line 3—3 thereof, and looking in the direction of the arrows.

Referring now to the drawing, and in particular to FIG. 1, the numeral 10 generally indicates a fragmentary portion of a machine tool spindle of the type employed in a jig boring machine, a milling machine, and the like. The numeral 11 generally indicates an indicator means which is carried by the spindle 10 for cooperation with the center line locating instrument generally indicated by the numeral 12 that is disposed on the worktable 13 of the machine tool which is shown in fragment. The center line of the spindle 10 is designated by the numeral 14.

The center line locating instrument 12 includes a circular setting plate 15 which is secured to the top end of a cylindrical steel body 16 by any suitable means, as, for example, the flat head screws 17 and 18. The body 16 is provided with a means for releasably holding the body on a worktable as 13. In the illustrated embodiment, the last mentioned releasable holding means comprises a permanent magnet 20 which is mounted in a cylindrical lead sleeve 19 that is disposed in the lower end of the body 16.

As best seen in FIG. 2, the center line plate 15 includes a circular hole 21 which is formed on the upper side of the plate 15 and in the position tangent to the axial center line 22 of the plate 15. The hole 21 is provided with a precision ground surface. The outer diameter or periphery of the plate 15 is also precision ground and is provided with a surface hardness of between 62 and 65 Rockwell "C."

The center line locating instrument 12 is adapted to be used with any suitable indicator means 11 for aligning the center line 14 of the spindle 10 with the center line 22 of the plate 15. The illustrated indicating means 11 comprises a suitable dial indicator 24 provided with a contact ball 23. The indicator 24 is carried by a mounting arm 25 which is hinged to the lower end of a connecting link 26. The upper end of the link 26 is hinged to the lower end of a shaft 27 that is mounted in the spindle bore 28.

In use, the center line locating instrument 12 would be disposed on the surface of the worktable 13 and held in position thereon by the magnet 20. It will be understood, that the surface of the worktable 13 is perpendicular to the center line 14 of the spindle 10. The instrument 12 may be moved sidewards by the application of finger pressure so as to bring the outer diameter of the plate 15 into concentric alignment with the axis or center line 14 of the work spindle 10. This aligning operation is effected by means of the indicator 24 which has the contact ball 23 in sliding engagement with the outer diameter of the plate 15. After the operator has adjusted the position of the instrument 12 so that the reading on the indicator 24 is constant as the indicator is rotated about the instrument 12, the indicator 24 with its contact ball 23 is then moved to the dotted line position shown in FIG. 1. The indicator contact ball 23 is then moved about the inside surface of the hole 21, at the point where this hole is tangent with the center line 22 of the plate 15, until the dial indicator picks up the lowest point or reading. This last-obtained indicator reading represents the true center line of the work spindle 10, and this preset zero setting of the indicator, combined with the measuring system of the machine tool, makes it possible for the operator to quickly and easily locate the edges, check dimensions, and other details on successive workpieces mounted on the worktable 13. The aforementioned zero setting of the indicator 24 can also be used for any other kind of operation where it is desired to locate the center line of the work spindle 10. The location of the hole 21 relative to the outer surface of the plate 15 will determine the accuracy of the instrument 12. It has been found that the setting plate 15 can be manufactured to gaging tolerances of less than 50-millionths of an inch.

It will be understood, that a raised cylindrical member having its outer side surface tangent to the plate center line 22 may be used instead of the hole 21. Also, a raised ridge in the form of an arc, or portion of a circle, may be disposed on the plate 15 with its outer surface tangent to the plate center line 22 and used in place of the hole 21.

While it will be apparent that the preferred embodiment of the invention herein disclosed is well calculated to fulfill the objects above stated, it will be appreciated that the invention is susceptible to modification, variation and change.

What is claimed is:

1. A center line locating instrument for locating the center line of a spindle on a machine tool having a worktable disposed perpendicular to the spindle and an indicating means with a contact member mounted on the spindle that is provided with an indicator contact ball, the combination, comprising:
    (a) a body;
    (b) said body being provided with a top end and a bottom end and with means for releasably holding the bottom end of said body on said worktable in an adjusted position;
    (c) a circular plate, having a precision finished periphery mounted on the top end of said body and with said periphery perpendicular to said bottom end; and,
    (d) means defining an arcuate surface originating at and extending perpendicular to the circular plate and disposed tangent to the axial center line of the circular plate, whereby a true center indicator reading on said indicator means may be obtained by first engaging the indicator contact member against said outer diameter and rotating the indicator contact member about the circular plate and adjusting said body on the worktable until the indicator reading is constant throughout the rotation about the circular plate, and then secondly inserting the indicator contact member against said arcuate surface and moving the same back and forth along said surface until the lowest reading on the indicator is obtained which indicates the true center line of the spindle.

2. A center line locating instrument as defined in claim 1, wherein:
    (a) said releasable holding means comprises a magnet.

3. A center line locating instrument as defined in claim 1, wherein:
    (a) said means defining an arcuate surface comprises the wall surface of a hole in said circular plate.

References Cited

UNITED STATES PATENTS 2,533,198   12/1950   Radtke.
2,665,492   1/1954   Freimark.

LEONARD FORMAN, *Primary Examiner.*

R. A. FIELDS, *Assistant Examiner.*

U.S. Cl. X.R.

33—169